US007263350B2

(12) United States Patent
Kizu et al.

(10) Patent No.: US 7,263,350 B2
(45) Date of Patent: Aug. 28, 2007

(54) PORTABLE ELECTRONIC INFORMATION DEVICE

(75) Inventors: Masafumi Kizu, Toyota (JP); Masayuki Yurimoto, Toyota (JP); Kenji Mori, Toyota (JP); Simon D. Humphries, Toyota (JP); Kikuko Yamawa, Nisikamo-gun (JP); Kota Nezu, Toyota (JP); Akira Shinada, Meguro-ku (JP); Katsuhiko Nunokawa, Kamakura (JP); Hiroaki Okajima, Chiba (JP)

(73) Assignees: Toyota Jidosha Kabushiki Kaisha, Toyota (JP); Sony Corporation, Tokyo (JP)

( * ) Notice: Subject to any disclaimer, the term of this patent is extended or adjusted under 35 U.S.C. 154(b) by 701 days.

(21) Appl. No.: 10/218,560

(22) Filed: Aug. 15, 2002

(65) Prior Publication Data

US 2003/0045278 A1 Mar. 6, 2003

(30) Foreign Application Priority Data

Aug. 31, 2001 (JP) .......................... P2001-264403

(51) Int. Cl.
*H04M 3/42* (2006.01)

(52) U.S. Cl. .............................. 455/414.1; 455/550.1; 455/563; 340/462.28

(58) Field of Classification Search ............ 455/414.1, 455/550.1, 563, 575.1, 90.3; 340/426.28, 340/426.36
See application file for complete search history.

(56) References Cited

U.S. PATENT DOCUMENTS 4,931,789 A * 6/1990 Pinnow ..................... 340/5.64
6,161,005 A * 12/2000 Pinzon ....................... 455/403

FOREIGN PATENT DOCUMENTS

JP A 8-255033 10/1996
JP A 8-272474 10/1996
JP A 8-272475 10/1996

* cited by examiner

*Primary Examiner*—Temica Beamer
(74) *Attorney, Agent, or Firm*—Oliff & Berridge, PLC

(57) ABSTRACT

A portable electronic information device with superb portability and/or amusement value is provided. This device A is a portable electronic information device A having an external housing 1 that can be equipped in a car, and the device A is provided with expression means 7, 8 and 9 for performing actions that can be sensed by the user of the vehicle, in accordance with vehicle status information of the vehicle or output signals from sensors 4 or 5 equipped inside external housing 1, and thus delivers superb amusement value. This device also functions as a vehicle key, providing high portability, and enabling information to be shared with a home computer, thus providing a high level of convenience.

21 Claims, 4 Drawing Sheets

PORTABLE ELECTRONIC INFORMATION DEVICE

BACKGROUND OF THE INVENTION

1. Field of the Invention

The present invention relates to a portable electronic information device.

2. Related Background Art

Portable electronic information devices have been disclosed which store the preference information of a user; one such example is Japanese Patent Application Laid-Open (Kokai) No. H8-255033. This apparatus stores the user's preferred screen brightness, font, and the like, and transfers this information to a new computer. Additionally, this apparatus stores the user's preferred seat position, and transfers this information to an electronic device mounted in a rental car. Thus, a variety of devices are made easier to use for the user.

SUMMARY OF THE INVENTION

In order to collect preference information and reflect preference information stored in a variety of electronic devices, it is preferable for the user to have this apparatus on his or her person at all times. In actuality, however, the user forgets to carry such an apparatus on his or her person. With the foregoing issues in view, an object of the present invention is to provide a portable electronic information device with excellent portability or entertainment value.

In order to resolve the above-mentioned issues, the portable electronic information device relating to the present invention comprises key means for locking and/or unlocking a door; input means for inputting information from a first external device; storage means for storing the information input via said input means; and output means for outputting the information stored in said storage means to a second external device.

While the portable electronic information device of the present invention transmits information between differing first and second external devices, even if the external devices are in different locations, the portable electronic information device has key means, which it is thought that the user will carry on his or her person at all times, thus increasing the portability of said portable electronic information device.

Some examples of doors that are locked and/or unlocked by the key means are home doors, workplace doors, and vehicle doors. It is also permissible for the key means to operate with a plurality of doors. Furthermore, the key means may be an electronic key that performs locking and/or unlocking electronically, or to be a mechanical key that performs locking and/or unlocking physically.

Some examples of external devices are televisions, radios, and other apparatuses for playing back received radio waves; personal computers and other computers with communication functions; audio systems; car navigation systems; and vehicle-mounted sensors.

It is also permissible for the portable electronic information device of the present invention to have input information processing means for processing information to reflect a user's preference information in the information input from said first external device; and device control means for controlling said second external device by outputting processed information from said output means to said second external device.

In other words, the input information processing means conducts processing to reflect the user's preference information in the input information, by extracting the user's preference information from the information input from a first external device, analyzing it, and interpreting it, or by adding preference information, and integrating the information input from the first external device with the preference information input from another external device. The device control means controls the second external device via the output of processed information to the second external device, from the output means. Thus, the usefulness of the information input from the first external device to the user is increased.

It is preferable for the above-mentioned door to be a vehicle door; because the key means is a vehicle key, the portable electronic information device is always carried inside the vehicle, facilitating the transmission of information between external devices inside the vehicle, and external devices outside the vehicle.

It is also possible for the first external device to be a device that obtains vehicle status information. In other words, said device may be a sensor or the like mounted on a vehicle. In this case, it is possible to bring vehicle status information outside the car, using the portable electronic information device.

The portable electronic information device of the present invention may further have expression means for performing actions that can be sensed by a user, in accordance with information input via the input means. Furthermore, it is also permissible for the portable electronic information device of the present invention to further have expression means for performing actions that can be sensed by a user, in accordance with signals output from an environment detection sensor, via the input means or not via the input means. This kind of apparatus provides excellent amusement value, by performing the actions above in accordance with input signals. Note that the expression means comprises at least one of voice output means, light emission means and vibration means. Additionally, the environment detection sensor is preferably an acceleration sensor, temperature sensor, odor sensor, or the like.

The portable electronic information device of the present invention having such functions is a portable electronic information device having a vehicle-mountable external housing, and that is provided with expression means for performing actions that can be sensed by the vehicle user, in accordance with vehicle status information or signals output by a sensor equipped inside the external housing. The present device has rich amusement value, as its expression means performs the above-mentioned types of actions.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Below are described preferred embodiments of the portable electronic information device. Note that the same reference numbers are used for identical components or elements, and overlapping descriptions are omitted.

Figure 1:
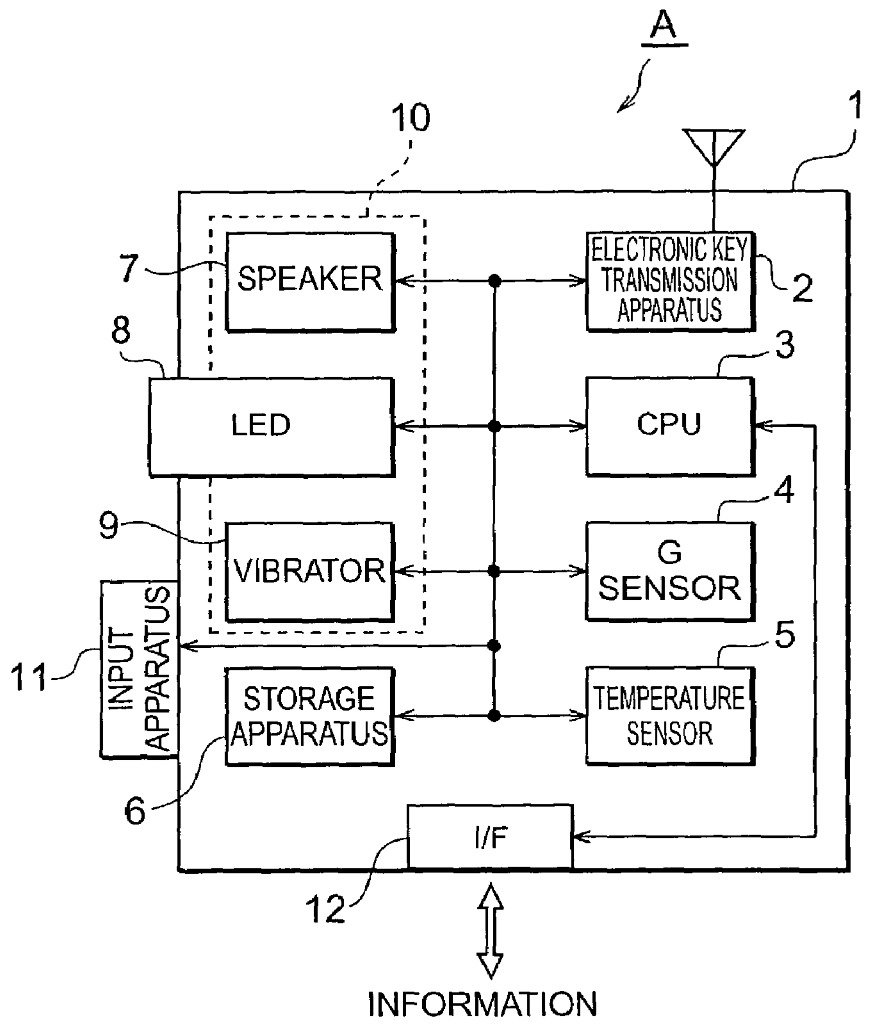
FIG. 1 is a block diagram of portable electronic information device A according to an embodiment of the present invention.

FIG. 1 is a block diagram of a portable electronic information device A according to an embodiment of the present invention. External housing 1 accommodates electronic key transmission apparatus (key means) 2, CPU (central processing unit; control means) 3, G (acceleration) sensor 4, temperature sensor 5, and storage apparatus (storage means) 6. These are environment detection sensors, other examples being an odor sensor and the like. Additionally, the present device A has expression means 10, such as a speaker (voice output means) 7, LED (light emitting diode; light emission means) 8, vibrator 9, and the like, and at least one of these may be selected and mounted in the present device A. An input apparatus 11 comprising a plurality of switch buttons is attached to the outer surface of the external housing 1.

When a particular switch button of input apparatus 11 is pressed, CPU 3 controls transmission apparatus 2, sending an electronic key from transmission apparatus 2. The vehicle door is locked and/or unlocked by receiving the electronic key sent from transmission apparatus 2.

Input/output interface (functions as input means when information is input, and output means when information is output) 12 is attached to external housing 1. Vehicle status information or information from another electronic device is input to output interface 12. For example, let an external device providing vehicle status information be a first external device, and another electronic device be a second external device. Some examples of external devices are televisions, radios, and other apparatuses for playing back received radio waves; personal computers and other computers with communication functions; audio systems; car navigation systems; and vehicle-mounted sensors.

Information input via input/output interface 12 is stored in storage apparatus 6 via CPU 3. CPU 3 controls storage apparatus 6 so that the information stored in storage apparatus 6 is output via input/output interface 12.

If portable electronic information device A is carried as a vehicle key, storage apparatus 6 storing various information, CPU 3, and input/output interface 12 housed in external housing 1 are also made portable, and thereby the portability of the device is improved. This portable electronic information device stores vehicle status information and information from other electronic devices obtained via input/output interface 12 in storage apparatus 6.

Figure 2:
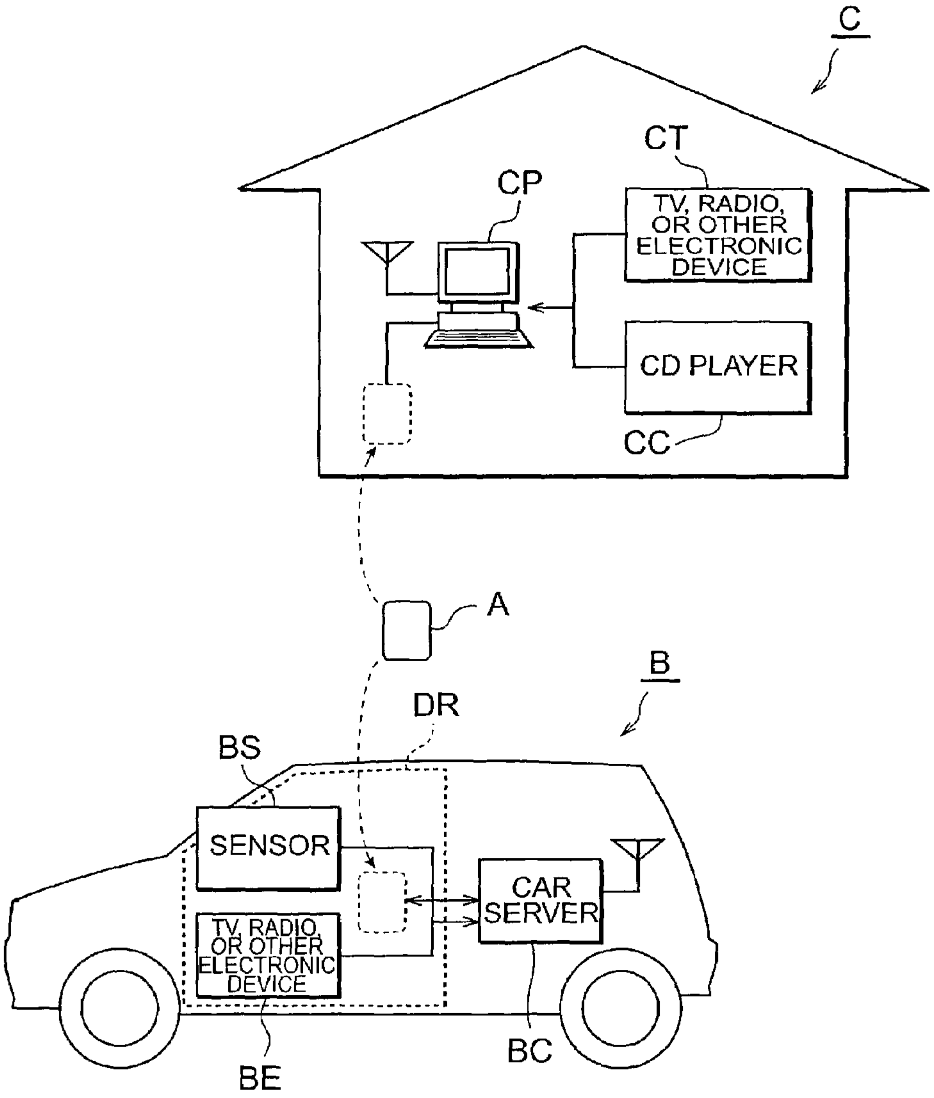
FIG. 2 shows a vehicle B and an at-home electronic device group C to which portable electronic information device A shown in FIG. 1 is applied.

FIG. 2 shows a vehicle B and an at-home electronic device group C to which portable electronic information device A is applied. Note that the description below makes reference to FIG. 1 as appropriate. In vehicle B are mounted sensors BS, television, radio, audio system, or other electronic device BE, and car server BC with communication function connected to electronic device BE.

First, description will be made about the case where the electronic device that inputs information into portable electronic information device A is electronic device BE mounted in vehicle B. If this electronic device BE is a CD (compact disc) player or other audio device, its audio track name list, music data, and the like are stored in storage apparatus 6 via car server BC and input/output interface 12. The information stored in storage apparatus 6 is carried back to the home in the portable electronic information device A as the vehicle key, and by connecting portable electronic information device A to another electronic device (computer) CP or audio system (computer CP, CD player CC) capable of storing information of the same type, it is possible to record the information in said audio system.

In addition, identical information stored in the audio system (computer CP, CD player CC) can also be stored in storage apparatus 6 inside said portable electronic information device A via input/output interface 12. Thus, if portable electronic information device A is set inside vehicle B, portable electronic information device A is connected to car server BC, and it is possible to conduct reproduction on electronic device BE of vehicle B based on the information stored in storage apparatus 6.

Next, description will be made about the case where electronic device BE that inputs information into portable electronic information device A is a television, radio, or other apparatus for playing back received radio waves mounted in vehicle B. In this case, a program list and the like are stored in storage apparatus 6. The information stored in storage apparatus 6 is carried back to the home in the portable electronic information device as the vehicle key, and it is possible to record the information in another electronic device or apparatus for playing back received radio waves in the home (computer CP, electronic device CT) capable of storing information of the same type, by connecting portable electronic information device A thereto.

In addition, the information of the same type stored in the home apparatus for playing back received radio waves CP, CT can also be stored in storage apparatus 6 of said portable electronic information device A via input/output interface 12. Thus, if portable electronic information device A is set inside vehicle B, portable electronic information device A is connected to car server BC, and it is possible to conduct reproduction on the apparatus for playing back received radio waves (car server BC, electronic device BE) based on the information stored in storage apparatus 6.

Next, description is made about the case where the electronic device BE that inputs information into portable electronic information device A is a computer with communication function or other Website-browsing apparatus mounted in vehicle B. In this case, Internet URLs (uniform resource locators) and the like are stored in storage apparatus 6. The information stored in storage apparatus 6 is carried back to the home in the portable electronic information device as the vehicle key, and it is possible to store the information in another electronic device or home computer with communication function CP capable of storing information of the same type, by connecting portable electronic information device A thereto.

In addition, the information of the same type stored in the home computer with communication function CP can also be stored in storage apparatus 6 inside said portable electronic information device via input/output interface 12. Thus, if portable electronic information device A is set inside vehicle B, portable electronic information device A is connected to car server BC, and it is possible to conduct reproduction on the apparatus for browsing Websites based on the stored information.

Next, description will be made about the case where the electronic device BE that inputs information into portable electronic information device A is a vehicle-mounted car navigation system. In this case, a destination history used in the past by the car navigation system, driving routes and areas with high frequency of use, and the like are stored in storage apparatus 6. The information stored in storage apparatus 6 is carried back to the home in the portable electronic information device as the vehicle key, and by connecting portable electronic information device A to another electronic device or home computer with communication function CP capable of storing information of the same type, it is possible to record the information in the computer CP. Map information is stored beforehand in this computer CP.

Location information stored in the home computer CP can also be stored in storage apparatus 6 inside said portable electronic information device via input/output interface 12. Thus, if portable electronic information device A is set inside vehicle B, portable electronic information device A is connected to car server BC, and it is possible to use the car navigation system of vehicle B based on the stored information.

It is also possible to record vehicle status information in storage apparatus 6. In this case, the information that is input via input/output interface 12 is signals from the vehicle-mounted sensors and the like. In this case, it is possible to carry vehicle status information outside the vehicle via the portable electronic information device.

This vehicle status information preferably includes at least one of remaining fuel, braking operation, speed, acceleration, engine speed, engine temperature, and cabin and external temperatures of vehicle B. The vehicle status information can be carried on one's person merely by carrying the portable electronic information device as the vehicle key, and if the portable electronic information device is connected to a home computer CP or the like, it is possible to confirm the history and the like of said information. Note that it is also permissible to cause portable electronic information device A to function as the engine starter.

In addition, as external housing 1 of portable electronic information device A can be mounted in vehicle B, the possibility of losing the portable electronic information device is reduced. For example, if a holding cradle is provided in the car for connection to car server BC, portable electronic information device A is connected to car server BC by being locked in place in said cradle.

In addition, as mentioned above, transmission apparatus 2, storage apparatus 6, CPU 3, input/output interface 12, and the like are housed in external housing 1, thereby being physically protected.

Note that as mentioned above, portable electronic information device A is disposed on the outer surface of or inside external housing 1, and is provided with expression means 7, 8, and/or 9 for performing actions that can be sensed by a user, in accordance with input signals to CPU 3. In this case, the actions of portable electronic information device A are interesting to the user, and thus portable electronic information device A has rich amusement value. These expression means are speaker 7, LED 8, and vibrator 9. In accordance with input to CPU 3, sound is generated from speaker 7, LED 8 emits light intermittently, or vibrator 9 vibrates.

These input signals to CPU 3 are said vehicle status information or information from said other electronic device, input via input/output interface 12.

For example, if the vehicle status information is the remaining fuel, if the remaining fuel falls below a predetermined value, at least one of expression means 7, 8, and 9 performs actions that give the user both amusement and warning.

If the vehicle status information is the braking operation of vehicle B, LED 8 emits light when the brake is pressed, for example.

If the vehicle status information is the speed of vehicle B, speaker 7 produces a sound when the speed exceeds a predetermined level, for example.

If the vehicle status information is the acceleration of vehicle B, LED 8 emits light when the acceleration exceeds a predetermined level, for example.

If the vehicle status information is the engine speed or engine oil temperature of vehicle B, speaker 7 produces a sound when the engine speed or engine oil temperature exceed a predetermined level, for example.

If the vehicle status information is the cabin temperature of vehicle B or external temperature, LED 8 emits light of a warm color while at the same sound is produced from speaker 7, for example, when the cabin or external temperature exceeds a predetermined level. When the cabin or external temperature falls below a predetermined level, LED 8 emits light of a cold color while at the same time vibrator 9 vibrates.

Additionally, in the case that expression means performs the above-mentioned actions in accordance with information from electronic device BE or CP, the amusement value of the portable electronic information device is increased, because the user recognizes the quality and quantity of the information, and the manner of causing recognition is distinctive.

As portable electronic information device A has a G sensor 4 housed inside the external housing 1, said input signals are output signals from G sensor 4. For example, if the user drops portable electronic information device A, expression means 7, 8, and/or 9 perform the above-mentioned actions, whereby portable electronic information device A is personified and the amusement value is increased. This also can apply to a G sensor that is outside the housing and mounted in the vehicle. In this case, however, the output signals from the G sensor are input via input/output interface 12.

Since portable electronic information device A has a temperature sensor 5 housed in external housing 1, said input signals become the output signals from temperature sensor 5. For example, if the temperature is high, expression means 7, 8, and/or 9 perform the above-mentioned actions as if human persons did when they are affected by heat. In other words, LED 8 emits light of a warm color, portable electronic information device A is personified, and its amusement value is enriched. Note that while the same effects can be obtained if the temperature sensor is mounted in the vehicle, outside the housing, in this case the output signals from the sensor are input via input/output interface 12.

A portable electronic information device A having such functions is a portable electronic information device having an external housing 1 that can be installed in a vehicle B, and being provided with expression means 7, 8, and/or 9 for performing actions that can be sensed by the user of vehicle B, in accordance with the vehicle status information of vehicle B or the output signals from sensor 4 or 5, equipped inside the outer housing. Note that the above-mentioned portable electronic information device A may have a mobile phone or other communication function.

Figure 3:
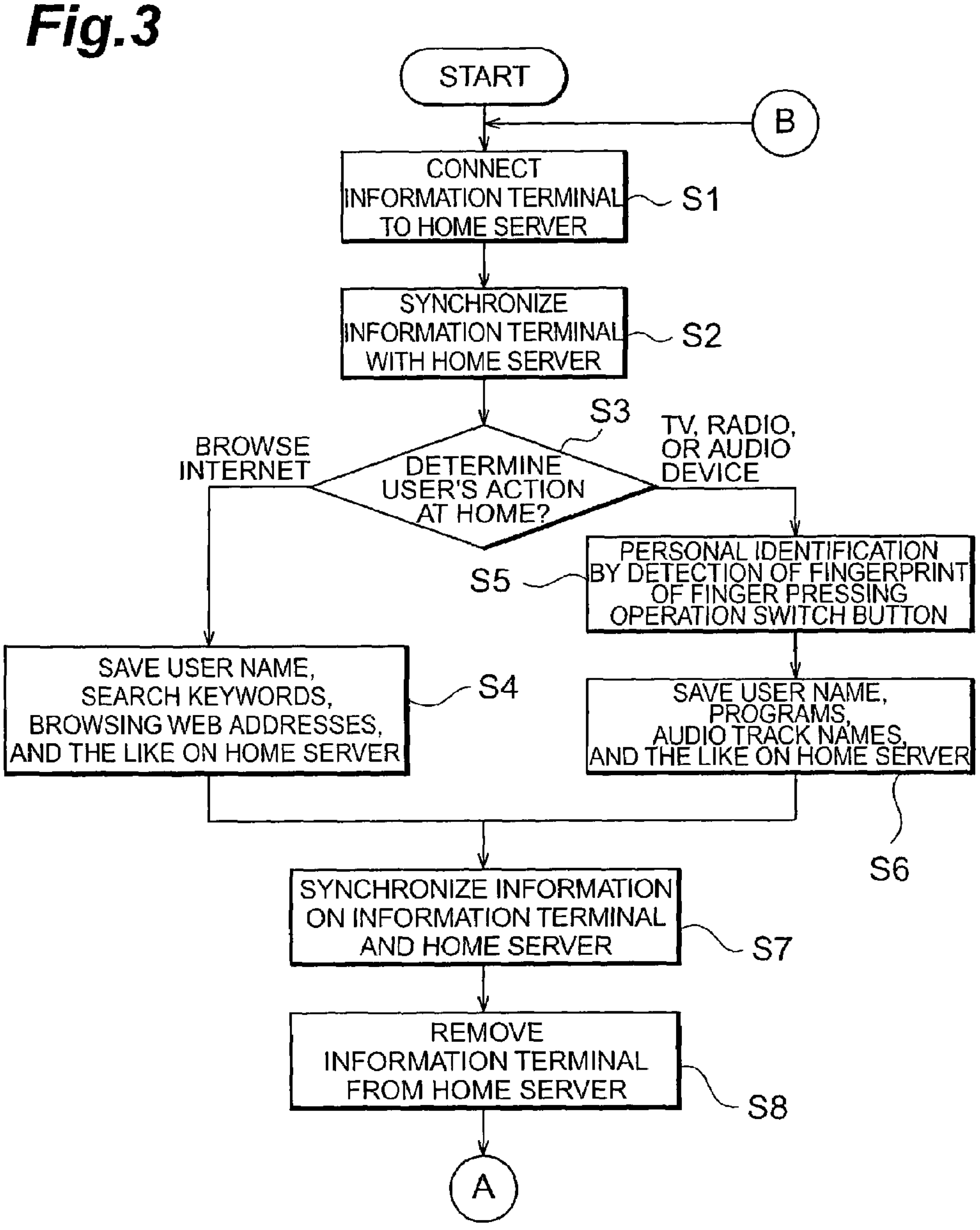
FIG. 3 is a flowchart describing the movement of information using portable electronic information device A.

FIG. 3 is a flowchart describing the movement of information using a portable electronic information device (hereinafter "information terminal").

First, when an information terminal A is connected to a home server (computer) CP installed in the home (S1), information in storage apparatus 6 of information terminal A and information stored in home server CP are shared (synchronized) (S2). If the storage apparatus 6 of information terminal A contains information of the same type as than in the home server CP, the most recent information is employed.

Home server CP stores histories relating to electronic devices CT and CC. Home server CP determines the user's status of utilization of electronic devices in the home, or in other words, home server CP determines the user's actions (S3). If the Internet was browsed, home server CP stores the user name, search keywords, browsed URLs, and the like for that browsing session (S4). If a television, radio, audio device (CT, CC) or the like is used, these devices are equipped with a fingerprint detection function, and home server CP matches the output of said fingerprint detectors with the a user, identifies the user (S5), and stores the user name, program lists, music track names, and, if necessary, music files (S6).

Next, after the information stored on storage apparatus 6 of the information terminal A has been shared (synchronized) with the information stored on home server CP (S7), information terminal A is removed from home server CP (S8), ending the processing in the home. Here as well, if storage apparatus 6 of information terminal A contains information of the same type as that stored in home server CP, the most recent information is employed.

Figure 4:
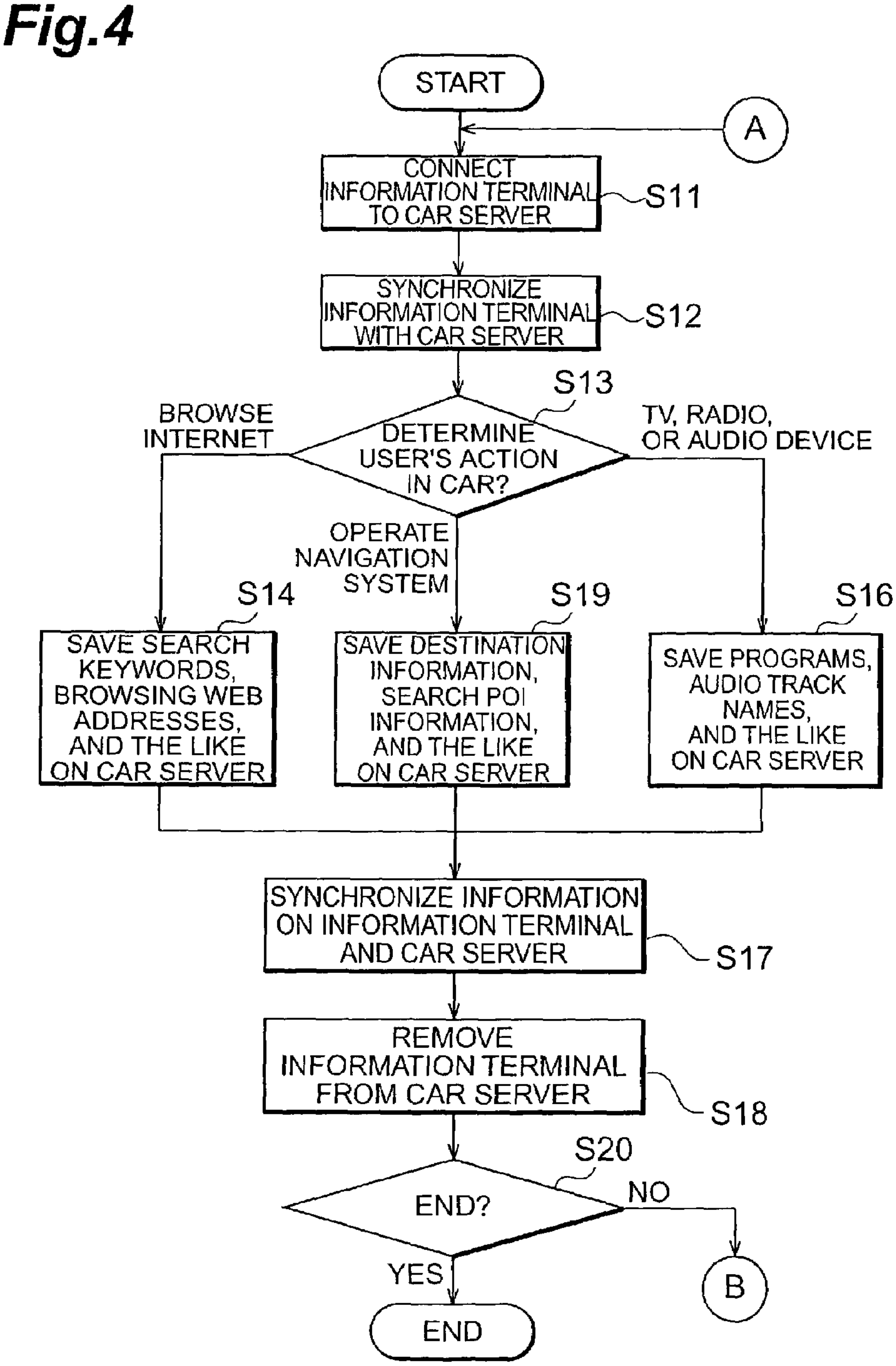
FIG. 4 is a flowchart describing the movement of information using portable electronic information device A.

FIG. 4 is a flowchart describing the movement of information using information terminal A.

When an information terminal A is carried from the home inside a car, and connected to the car server (computer) BC inside the car (S11), information in storage apparatus 6 of information terminal A and information stored in home server CP are shared (synchronized) (S12). If storage apparatus 6 of information terminal A contains information of the same time as that in the car server BC, the mot recent information is employed.

Car server BC stores histories relating to electronic devices BE. Car server BC determines the user's status of utilization of electronic devices in the car, or in other words, the user's actions in the car (S13). If the Internet was browsed, car server BC stores the search keywords, browsed URLs, and the like for that browsing session (S14).

If a television, radio, or audio device is used as the electronic device BE, car server BC stores program lists, music track names, and, if necessary, music files (S16).

If a car navigation system is used as the electronic device BE, car server BC stores destination information, search information of places of interest (POI), and the like (S19).

Next, after the information stored on storage apparatus 6 of information terminal A has been shared (synchronized) with the information stored on car server BC (S17), information terminal A is removed from car server BC (S18) and thus the processing in the car ends. If information terminal A is carried inside the home, however, a process is conducted again, beginning at above-mentioned step S1. Here, if storage apparatus 6 of information terminal A contains information of the same kind as that stored in car server BC, the most recent information is employed.

These information items reflect the user's preferences. The portable electronic information device of the present embodiment has input processing means (CPU 3) for conducting processing to reflect information on user preferences (e.g. the name of the music track that is most frequently listened to) input from car server BC as one example of the first external device, and device control means (CPU 3) for controlling computer CP as one example of the second external device, by causing the processed information to be output from input/output interface 12 to the second external device.

In the above-mentioned embodiment, the input processing means (CPU 3) extracts user preference information from the information input from car server BC, analyzes and interprets this information, and/or adds preference information, or reflects user preference information in the input information by integrating preference information input from another external electronic device with information input from the first external device. The device control means (CPU 3) controls the computer CP by inputting processed information from input/output interface 12 to computer CP. Thus, the usefulness to the user of the information input from the first external device is increased.

For example, it is possible to pick up track names that are played more often as preference information. The number of playbacks may be added to track names, and by analyzing and/or interpreting the cycle of order of tracks played back by a user, the track names the user will want to hear next can be ranked in the top part of the list, and such information also constitutes the user's preference information.

Further, the integration of information also can be done in such a way that input information processing means CPU3 of information terminal A links information from one external device that is a refrigerator with storage means for storing information on the user's preferred foods with information on location of food stores from another external device that is a car navigation system connected to car server BC, and determines, as one type of preference information, information on the locations of food stores selling the user's favorite foods.

The device control means (CPU 3) of information terminal A outputs the acquired preference information to car server BC, and the car navigation system is thereby controlled to display information on the locations of stores selling the user's favorite foods on the display apparatus thereof. It is also possible to link or add position information of the car navigation system with or to URL information of Web pages which are related to this position information, and frequently browsed on computer CP.

The doors that are locked and/or unlocked by means of transmission apparatus 2 include a home door, workplace door, vehicle door, and the like. A Vehicle door DR shown in FIG. 2 is an example. Transmission apparatus 2 may operate on a plurality of doors. Furthermore, transmission apparatus 2 is key means which may be an electronic key that performs locking and/or unlocking electronically, or a mechanical key that performs locking and/or unlocking physically.

Thus, as explained above, the portable electronic information device of the present invention has superb portability and/or amusement value.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A portable electronic information device, comprising:

key means for locking and/or unlocking a door;

input means for inputting information from a first external device, wherein the first external device inputs the information to the input means;

storage means for storing the information input via said input means; and output means for outputting the information stored in said storage means to a second external device.

2. The portable electronic information device according to claim 1, further comprising:

input information processing means for processing information to reflect a user's preference information in the information input from said first external device; and device control means for controlling said second external device by outputting processed information from said output means to said second external device.

3. The portable electronic information device according to claim 1, wherein said door is a vehicle door.

4. The portable electronic information device according to claim 1, wherein said first external device is a device that obtains vehicle status information.

5. The portable electronic information device according to claim 1, further comprising expression means for performing actions that can be sensed by a user, in accordance with information input via said input means.

6. The portable electronic information device according to claim 1, further comprising expression means for performing actions that can be sensed by a user, in accordance with output signals from an environment detection sensor.

7. The portable electronic information device according to claim 5, wherein said expression means comprise at least one of voice output means, light emission means, and vibration means.

8. The portable electronic information device according to claim 6, wherein said expression means comprise at least one of voice output means, light emission means, and vibration means.

9. A portable electronic information device having an external housing that can be mounted in a vehicle, comprising output means for performing actions that can be sensed by a user of said vehicle, in accordance with the vehicle status information of said vehicle or output signals from a sensor provided inside said external housing.

10. A portable electronic information device, comprising:

key means for locking and/or unlocking a door;

input means for inputting information from a first external device, wherein the first external device inputs the information to the input means;

storage means for storing the information input via said input means;

output means for outputting the information stored in said storage means to a second external device;

input information processing means for processing information to reflect a user's preference information in the information input from said first external device; and device control means for controlling said second external device by outputting processed information from said output means to said second external device, wherein said door is a vehicle door.

11. The portable electronic information device according to claim 10, wherein said first external device is a device that obtains vehicle status information.

12. The portable electronic information device according to claim 11, further comprising expression means for performing actions that can be sensed by a user, in accordance with information input via said input means.

13. The portable electronic information device according to claim 11, further comprising expression means for performing actions that can be sensed by a user, in accordance with output signals from an environment detection sensor.

14. The portable electronic information device according to claim 12, wherein said expression means comprise at least one of voice output means, light emission means, and vibration means.

15. The portable electronic information device according to claim 13, wherein said expression means comprise at least one of voice output means, light emission means, and vibration means.

16. The portable electronic information device according to claim 1, wherein said input means includes an I/O interface.

17. The portable electronic information device according to claim 16, wherein said I/O interface is a physical I/O interface.

18. The portable electronic information device according to claim 16, wherein said I/O interface is a wireless I/O interface.

19. The portable electronic information device according to claim 10, wherein said input means includes an I/O interface.

20. The portable electronic information device according to claim 19, wherein said I/O interface is a physical I/O interface.

21. The portable electronic information device according to claim 19, wherein said I/O interface is a wireless I/O interface.

* * * * *